2,827,496

PROCESS FOR THE PRODUCTION OF STYRENE CHLOROHYDRIN

Gerhard Käbisch, Hanau, and Ulrich Hoffmann, Bad Homburg, Germany, assignors to Deutsche Gold- und Silber-Scheideanstalt vormals Roessler, Frankfurt am Main, Germany No Drawing. Application October 17, 1955
Serial No. 541,058

Claims priority, application Germany October 30, 1954

5 Claims. (Cl. 260—618)

The present invention relates to an improved process for the production of halohydrins by reacting olefinic compounds in an aqueous medium with a halogen or respectively a hypohalous acid.

It is known that halohydrins can be prepared by treating olefines which are liquid under the reaction conditions such as, for example, styrene, with a hypohalous acid. The hypohalous acid employed usually is prepared by dissolving the corresponding halogen in water, or in a sodium bicarbonate solution or by treating an aqueous suspension of chloride of lime with carbon dioxide. It was found, however, that in addition to the addition of hypohalous acid onto the double bond of the olefine to produce the desired halohydrin, the corresponding dihalide was also formed as a by-product and consequently the yield of halohydrin never was quantitative and often was so low that the economy of the process was endangered.

According to the invention, it was unexpectedly found that the yield of halohydrin obtained could be considerably increased if the aqueous medium employed for reacting the halogen or hypohalous acid with the olefine is an aqueous solution of alkali metal and/or alkaline earth metal halides which, during the entire reaction, is substantially saturated with the halohydrin which is to be produced. The aqueous solution can be neutral or weakly alkaline or acid, i. e., have a pH between 9.0 and 5.0.

In order to obtain an aqueous reaction medium of the desired composition for carrying out the process according to the invention on a technical scale, it is advisable to recycle the aqueous layer obtained after separating the halogenation product, preferably, after neutralization with basic alkali metal or alkaline earth metal compounds, back to the halogenation process. It was furthermore found advantageous to maintain the density of the recycled aqueous medium higher than that of the crude halogenation product produced, as this measure facilitates the separation of the halogenation product from the aqueous medium.

In order to maintain the desired composition and density of the aqueous medium, a portion thereof can be removed in each cycle and be replaced with water. The process according to the invention can be carried out continuously or discontinuously.

The following example will serve to illustrate the process according to the invention:

Example

Over a period of 10 hours, 6 liters of styrene and 120 liters of a 25% $CaCl_2$ aqueous solution saturated with styrene chlorohydrin were treated with chlorine while the mixture was subjected to intensive stirring so that 80% of the styrene was converted. The reaction mixture was then introduced into a separating vessel and 6.8 liters of a crude chlorination mixture separated. This crude mixture had a density of 1.165 and contained 4680 grams of styrene chlorohydrin, 1630 grams of styrene dichloride, 1075 grams of styrene and 600 grams of residue. 7 liters of the aqueous medium which was separated from the crude chlorination product were removed and replaced with water and after neutralization with lime the aqueous medium was reused for further chlorination of styrene.

In a comparative test carried out under the same conditions except that water was used for the aqueous medium instead of the 25% $CaCl_2$ solution saturated with styrene chlorohydrin, the quantity of crude chlorination product obtained was 6 liters. Its density was 1.154 and it contained 3360 grams of styrene chlorohydrin, 1740 grams of styrene dichloride, 1130 grams of styrene and 560 grams of residue.

We claim:

1. In a process for the production of chlorohydrins by reacting styrene in an aqueous medium with hypochlorous acid, the step which comprises carrying out such reaction at about room temperature in an aqueous medium which is an aqueous solution of at least one chloride selected from the group consisting of alkali metal and alkaline earth metal chlorides initially saturated with the chlorohydrin to be produced and maintained saturated during the entire reaction with the chlorohydrin to be produced.

2. In a process for the production of chlorohydrins by reacting styrene in an aqueous medium with hypochlorous acid, the steps which comprise reacting the styrene at about room temperature with a hypohalous acid in an aqueous medium which is an aqueous solution of at least one chloride selected from the group consisting of alkali metal and alkaline earth metal chlorides initially saturated with the chlorohydrin to be produced and maintained saturated with the chlorohydrin to be produced during the entire reaction, separating the chlorination product from such aqueous medium and then recycling the aqueous medium to the reaction between the olefine and the hypochlorous acid.

3. The process of claim 2 in which the aqueous medium from which the chlorination product has been separated is neutralized with a basic compound selected from the group consisting of basic alkali and alkaline earth metal compounds.

4. The process of claim 2 in which the recycled aqueous medium has a density which is greater than that of the crude chlorination product produced.

5. The process of claim 2 in which a portion of the aqueous medium after it has been separated from the chlorination product is removed and replaced with water before it is recycled.

References Cited in the file of this patent

UNITED STATES PATENTS

| | | |
|---|---|---|
| 2,315,557 | Soday | Apr. 6, 1943 |
| 2,463,850 | Brooks | Mar. 8, 1949 |

OTHER REFERENCES

Hanby et al.: Jour. Chem. Soc. London (1946), page 114 (1 page).